United States Patent
Pierrot et al.

(10) Patent No.: US 9,545,718 B2
(45) Date of Patent: Jan. 17, 2017

(54) METHOD OF CONTROLLING A MACHINE WITH REDUNDANT PARALLEL ACTUATION, ASSOCIATED CONTROL DEVICE AND MACHINE

(75) Inventors: Francois Pierrot, Saint Jean de Vedas (FR); Ahmed Chemori, Montpellier (FR); Micaël Michelin, Montpellier (FR)

(73) Assignees: TECNALIA FRANCE, Montpellier (FR); CENTRE NATIONAL DE LA RECHERCHE SCIENTIFIQUE (C.N.R.S.), Paris (FR)

( * ) Notice: Subject to any disclaimer, the term of this patent is extended or adjusted under 35 U.S.C. 154(b) by 0 days.

(21) Appl. No.: 14/237,927

(22) PCT Filed: Aug. 8, 2012

(86) PCT No.: PCT/FR2012/051871
§ 371 (c)(1),
(2), (4) Date: Apr. 14, 2014

(87) PCT Pub. No.: WO2013/024227
PCT Pub. Date: Feb. 21, 2013

(65) Prior Publication Data
US 2014/0222200 A1    Aug. 7, 2014

(30) Foreign Application Priority Data
Aug. 12, 2011   (FR) ...................................... 11 02509

(51) Int. Cl.
G05B 19/04   (2006.01)
G05B 19/18   (2006.01)
B25J 9/16    (2006.01)

(52) U.S. Cl.
CPC ................... B25J 9/1623 (2013.01)

(58) Field of Classification Search
CPC ............... B25J 9/16; B25J 9/1623; B25J 9/00; B25J 13/00; B25J 9/12; B25J 9/18; G05B 11/42
(Continued)

(56) References Cited
U.S. PATENT DOCUMENTS 5,220,262 A * 6/1993 Kneifel et al. ................ 318/569
5,262,707 A * 11/1993 Okazaki et al. .............. 318/592
(Continued)

OTHER PUBLICATIONS

Shayya et al, A novel (3T-1R) redundant parallel mechanism with large operational workspace and rotational capability, 2013, 2013 IEEE/RSJ International Conference on Intelligent Robots and Systems (IROS), Nov. 3-7, 2013. Tokyo, Japan, pp. 436-443.*
(Continued)

*Primary Examiner* — Jaime Figueroa
(74) *Attorney, Agent, or Firm* — Young & Thompson

(57) ABSTRACT

A method of controlling a machine with redundant parallel actuation includes a frame and a mobile element driven by a plurality of mechanical transmissions parallel to one another and each being activated by an actuator (2) including a body fixed to the frame, an actuating member and a position sensor, in which an error signal is produced by comparing the position of each actuator with a setpoint signal, characterized in that the error signals are converted into a mobile element position error signal by applying data representative of the kinematics of the mechanical transmissions, the mobile element error signal is processed by a processing module which produces an effort signal to be applied to the mobile element, the effort signal is converted into signals controlling the actuators by applying data representative of the kinematics of the mechanical transmissions.

10 Claims, 2 Drawing Sheets

(58) Field of Classification Search
USPC ............... 700/245, 247, 253, 254, 258, 260, 261,700/262; 318/560, 564, 565, 566, 568.11, 318/568.12, 568.16, 568.17, 568.19, 568.22, 318/568.24, 574; 901/1, 2, 8, 9, 14, 30, 36, 46
See application file for complete search history.

(56) References Cited

U.S. PATENT DOCUMENTS

| | | | |
|---|---|---|---|
| 5,615,593 A * | 4/1997 | Anderson et al. ................ | 91/24 |
| 6,215,270 B1 * | 4/2001 | Nakamura et al. ........... | 318/700 |
| 6,463,357 B1 * | 10/2002 | An et al. ....................... | 700/245 |
| 6,998,996 B1 * | 2/2006 | Eidson ........................... | 340/4.2 |
| 2005/0017668 A1 * | 1/2005 | Maresca et al. .............. | 318/560 |
| 2007/0040527 A1 * | 2/2007 | Cardinale et al. ............ | 318/575 |
| 2009/0019960 A1 * | 1/2009 | Nabat et al. ............... | 74/490.03 |
| 2010/0072934 A1 * | 3/2010 | Benson et al. ................ | 318/564 |
| 2014/0114463 A1 * | 4/2014 | Shilpiekandula et al. .... | 700/173 |

OTHER PUBLICATIONS

Muller et al, A projection method for the elimination of contradicting control forces in redundantly actuated PKM,2011 IEEE International Conference on Robotics and Automation Shanghai International Conference Center, May 9-13, 2011, Shanghai, China, pp. 3218-3223.*
Muller, A Robust Inverse Dynamics Formulation for Redundantly Actuated PKM,13th World Congress in Mechanism and Machine Science, Guanajuato, M'exico, Jun. 19-25, 2011, pp. 1-8.*
Muller, Consequences of Geometric Imperfections for the Control of Redundantly Actuated Parallel Manipulators, IEEE Transactions on Robotics, vol. 26, No. 1, Feb. 2010, pp. 21-31.*
Muller, Effects of geometric imperfections to the control of redundantly actuated parallel manipulators, 2009 IEEE International Conference on Robotics and Automation, Kobe International Conference Center, Kobe, Japan, May 12-17, 2009, pp. 1782-1787.*
Li et al, Dynamic modeling and robust control of a 3-PRC translational parallel kinematic machine, 2008, Elsevier, journal homepage: www.elsevier.com/locate/rcim—Robotics and Computer-Integrated Manufacturing, vol. 25, pp. 630-640.*
Paccot et al., A Review on the Dynamic Control of Parallel Kinematic Machines: Theory and Experiments, 2009, The International Journal of Robotics Research, vol. 28, No. 3, Mar. 2009, pp. 395-416.*
Majarena et al., An Overview of Kinematic and Calibration Models Using Internal/External Sensors or Constraints to Improve the Behavior of Spatial Parallel Mechanisms, Sensors 2010, 10, pp. 10256-10297.*
Majarena et al., Modelling and calibration of parallel mechanisms using linear optical sensors and a coordinate measuring machine, 2011, IOP Publishing, Measurement Science and Technology, pp. 1-12.*
Yang et al., Kinematic Design of a Six-DOF Parallel-Kinematics Machine With Decoupled-Motion Architecture, 2004, IEEE Transactions on Robotics, vol. 20, No. 5. pp. 876-884.*
Abtahi et al., Experimental kinematic calibration of parallel manipulators using a relative position error measurement system, 2010, Elsevier, Robotics and Computer-Integrated Manufacturing 26 (2010), pp. 799-804.*
International Search Report dated Apr. 4, 2013, corresponding to PCT/FR2012/051871.
David Corbel, et al.; Towards 100G with PKM. Is actuation redundancy a good solution for pick-and-place?; 2010 IEEE International Conference on Robotics and Automation: ICRA 2010; May 3, 2010; pp. 4675-4682; XP031709026.
Xiaoli et al., "Error Analysis and Compensation of a Parallel Mechanism for Virtual-axial Worktable," 2007, China Academic Journal Electronic Publishing House.
Zhen-Yu et al., "Error Modeling and Performance Comparison of 3-DOF Modules of Two Reconfigurable PKM-the Tricept and the TriVariant," Oct. 2007, Journal of Tianjin University.

* cited by examiner

METHOD OF CONTROLLING A MACHINE WITH REDUNDANT PARALLEL ACTUATION, ASSOCIATED CONTROL DEVICE AND MACHINE

The invention relates to a method and a device for controlling a machine with redundant parallel actuation and a machine controlled by such a device and/or according to such a method. The invention is applicable to a machine, in particular a manipulation robot, with redundant parallel actuation for high speed and high acceleration applications.

DESCRIPTION OF THE RELATED ART

With regard to robotic tasks carried out at ultra-high frequencies, the use of so called "parallel" machines is known, in particular manipulation robots, i.e. with a frame and a mobile element driven simultaneously by a plurality of parallel driven mechanical transmissions. This multiplication of driven mechanical transmissions allows greater driving power to be obtained in relation to the inertia of the mobile element (tools, objects to be moved, etc.). High displacement and acceleration speeds therefore can be achieved by such devices, the actuation of which is referred to as "redundant" as long as they comprise more driven mechanical transmissions than the mobile element has degrees of freedom within the space. For example, the "R4" parallel manipulator described by Corbel et al in, "*Towards 100 g with PKM. Is actuation redundancy a good solution for pick and place?*" in Proceedings of the IEEE International Conference on Robotics and Automation, pp. 4675-4682, 2010, comprises a mobile element actuated by four actuators via four mechanical transmissions. The mobile element comprises a gripping tool and can move within the space along three degrees of freedom.

Therefore, methods for controlling machines with redundant parallel actuation are known in which a setpoint trajectory of the mobile element is converted into setpoint trajectories of the actuators of the driven mechanical transmissions. These setpoint trajectories of the actuators are compared with a measurement of the position of the actuator before being processed by an electronic processing module, for example of the proportional derivative (PD) or proportional integral derivative (PID) type. This processing module therefore provides control for the actuators.

In some of these known methods a control term by anticipative action (sometimes called feed-forward) of each actuator is added to the control for the actuators.

However, numerous disadvantages remain in these known methods that limit the performance of machines with redundant parallel actuation.

Indeed, in a machine with redundant parallel actuation, at least one degree of freedom of the mobile element depends on the positions of at least two actuators. However, the actuators are adjusted and controlled on the basis of position measurements of the actuators themselves and not of the mobile element. In this way, inevitable geometric errors (thermal heating, manufacturing tolerance, elasticity, etc.) can result in two actuators having behavior that is contradictory for each of them to return to their setpoint position (corresponding to a setpoint position of the mobile element) and thus can result in the development of significant internal mechanical stresses.

These internal mechanical stresses are even greater when the processing module (or controller) comprises an integral term that over time accumulates the errors between setpoints and measurements of the positions of the actuators and thus increases the mechanical efforts exerted by two actuators exerting counter-efforts. In practice, the maximum acceleration capacities of such a known machine must be restricted in order to prevent any mechanical breakages.

Moreover, further disadvantages remain, such as inaccurate positioning of the mobile element. In effect, the actuators only rarely reach their setpoint position, they remain active and can cause small movements (of the order of magnitude of geometric faults) of the mobile element even when a static setpoint position of the mobile element is requested by the machine control program.

Furthermore, the parallel processing of a plurality of actuator position error signals requires significant resources and computation times in the case of complex processing. In effect, the time for producing each control-command loop is longer when the processing of error signals is itself long.

BRIEF SUMMARY OF THE INVENTION

Therefore, the object of the invention is to overcome these disadvantages.

In particular, the object of the invention is to propose a method for controlling a machine with redundant parallel actuation that is both efficient in terms of speed of execution, and which particularly allows high accelerations to be achieved.

A further object of the invention is to propose such a method for procuring a high level of mobile element positioning accuracy.

A further object of the invention is to propose such a method for controlling a machine with simple redundant parallel actuation and with a short computation time, and which can be implemented with conventional computer resources.

In particular, the object of the invention is to propose such a method that is compatible with the inevitable geometric errors of such a machine.

A further object of the invention is to propose such a method that is inexpensive to implement, particularly one which only requires software or electronic modifications to a control device.

Throughout the entire document, the term "mobile element" refers to any combination of a tool and/or an object to be moved and/or a fixture, etc., located at the end of a mechanical and kinematic chain of the machine, and for which the movements require the use of the machine.

Therefore, the invention relates to a method for controlling a machine comprising:
 a frame,
 a mobile element driven in relation to the frame by a plurality of mechanical transmissions, the number of which is strictly greater than the number of degrees of freedom of the mobile element, said mechanical transmissions being parallel to each other and each being actuated by at least one actuator comprising:
  a body fixed to the frame,
  a member for actuating a mechanical transmission,
  a position sensor designed to produce a signal, referred to as measured position signal, representing a position of the actuating member, according to which method, for each of the actuators, a signal, referred to as actuator error signal, is produced by comparing the measured position signal of said actuator with a position setpoint signal of said actuator,
 wherein:
  the actuator error signals are converted into a mobile element position error signal, referred to as mobile element error signal, by applying data representing the kinematics of the mechanical transmissions;

the mobile element error signal is processed by a processing module designed to produce an effort signal to be applied to the mobile element;

the effort signal is converted into signals for controlling the actuators by applying data representing the kinematics of the mechanical transmissions.

Actuators according to the invention can be selected from among any type of actuator, for example rotary motors, cylinders, etc. The body of each actuator is advantageously rigidly fixed to the frame of the machine so that the mobile actuating member of each actuator is mobile relative to the frame.

The mobile actuating member of an actuator is the mobile part that allows the transfer of mechanical power: for example, the rotor of a rotary motor, the mobile shaft of a cylinder, etc.

The mechanical transmissions are each connected to at least one actuating member of an actuator and are therefore driven by the actuators. In addition, each mechanical transmission is connected to the mobile element so as to transmit a displacement (or an effort) thereto. As the number of driven mechanical transmissions connected to the mobile element is greater than the number of degrees of freedom of the mobile element, this is a machine with redundant parallel actuation, i.e. a machine for which the mechanical transmissions are parallel. The machine therefore has parallel kinematics and redundant actuation, in particular parallel actuation of each of the transmissions. In particular, the machine differs from a machine with redundant in-series actuation, for which the transmissions are in-series one after the other, with each therefore being actuated with redundant actuation, but in which the mobile element is directly mechanically connected to a number of transmissions lower than its number of degrees of freedom.

The signals (setpoint, position, control, etc.) are advantageously electronic signals, in particular digital signals. In this way, the processing module is advantageously an electronic circuit or a software function equivalent to an electronic circuit.

Each actuator error signal is produced by comparing, particularly by subtracting, the position setpoint signal of the actuating member from the measured position signal of said actuating member. An actuator error signal is specific to an actuator in particular so that each of the actuators is associated with an actuator error signal specific thereto.

The invention involves processing (by means of a processing module) the mobile element error signal and not a plurality of actuator error signals (relating to the positions of the actuating members). The mobile element error signal is obtained by converting all of the actuator error signals by a kinematic model of the mechanical transmissions.

Even though the mobile element error signal is homogenous with a mobile element position error, it does not correspond to the actual position error of the mobile element between a mobile element setpoint position and the actual position of the mobile element. In effect, due to geometric faults of the mechanical transmissions, the actual positioning error of the mobile element is not zero when the mobile element error signal has a zero value.

However, the inventors have determined that this method enables any conflict in actuation between a plurality of actuators to be eliminated.

The invention also enables the processing time of a method according to the invention to be improved, in particular when the processing module carries out complex processing. In effect, the processing module only processes the mobile element error signal and no longer processes a plurality of actuator error signals.

The invention also and importantly allows control signals to be sent to the actuators that are not contradictory as they are all computed on the basis of the same mobile element error signal, and thus of the same effort signal (obtained by the processing of the mobile element error signal by the processing module), homogenous with a force to be applied to the mobile element.

In this way, in a method according to the invention, the position errors of the actuators are not individually corrected but the sum of the position errors of the actuators (weighted by a kinematic model of the mechanical transmissions with the mobile element) is corrected. In this way, the inventors have succeeded in eliminating any conflicting control of the actuators, and this is achieved despite any geometric faults in the machine.

In this way, the invention enables a machine to be obtained for the first time with parallel actuation that can be used to the maximum of its mechanical drive capacities, and thus at very high speeds and accelerations.

Furthermore, and unexpectedly, the measurements carried out by the position sensors (of the actuating members) of the actuators when the machine reaches a stopped position for a given setpoint position allow the geometric faults of the machine to be determined at this given instant.

In a control method according to the invention, the geometric faults of the machine (particularly due to the mechanical transmissions) are shown on the mobile element, the final position of which is slightly different from the imposed setpoint position.

However, this error in the positioning of the mobile element does not have a significant impact as no measurement is undertaken on the position of the mobile element and it generally involves minimum geometric faults. These geometric errors on the positioning of the mobile element are even lower when the geometric errors of the machine are generally non-cumulative. Furthermore, geometric faults that are constant over time, such as manufacturing tolerances, or variable over the long-term, such as part wear, cause a static error in the positioning of the mobile element so that the successive relative positions of the mobile element are reliable.

Furthermore, the actuators are definitely stopped as soon as a setpoint position is reached (to the nearest geometric faults) so that the mobile element is perfectly immobile.

Advantageously, and according to the invention, the position setpoint signal of the actuating member of each actuator is obtained by applying data representing the geometry of the mechanical transmissions to a signal representing a mobile element setpoint position.

A mobile element position setpoint signal is generally an item of data provided by a program for controlling a machine as a function of the displacements that an operator wishes to apply to the mobile element of the machine. In a method according to the invention, a geometric model of the mechanical transmissions connecting the actuators to the mobile element enables this mobile element position setpoint signal to be converted into position setpoint signals of the actuators.

Advantageously, and according to the invention, the processing module comprises a controller of the PID (Proportional Integral Derivative) type. Such a PID controller can be implemented in particular by a physical electronic circuit or by a software function.

The invention is particularly advantageous in the case of a processing module comprising an integral term. In effect, in a method according to the invention, the mobile element error signal obtained by virtue of the conversion of all of the actuator error signals and of a kinematic model of the mechanical transmissions is always returned to zero by non-conflicting displacements of the actuators. There is therefore no cumulative effect over time by a processing module comprising an integral term. In this way, when a balanced position is achieved, all of the actuators are stopped and no mechanical stress is applied.

Furthermore, advantageously and according to the invention, a signal representing a setpoint acceleration of the mobile element multiplied by an inertia coefficient representing the inertia of the mobile element is added to the effort signal.

The inventors have determined that, with an effort signal homogenous with a force to be applied to the mobile element after processing by the processing module, it is then possible to add a signal thereto coming from the mobile element position setpoint twice-derived and multiplied by a coefficient representing the inertia of the mobile element. In this way a feed-forward control loop is produced. For the first time, by virtue of a method according to the invention, it is possible to directly inject into the control a feed-forward control term relating to a setpoint acceleration of the mobile element.

This control loop by the setpoint acceleration of the mobile element improves the performance of the machine, in particular obtaining higher speed and accuracy of execution.

Advantageously, and according to the invention, a signal representing a setpoint acceleration of each actuator is added to the control signal of said actuator.

In a method according to the invention, two feed-forward control loops therefore can be provided:
- a first loop adds a setpoint acceleration term of the mobile element to the effort signal multiplied by the inertia of the mobile element just after the processing of the mobile element error signal by the processing module;
- a second loop adds setpoint acceleration terms of the actuating members, each multiplied by at least the inertia of the corresponding actuating member, to the actuator control signals just after the conversion of the effort signal into actuator control signals.

Furthermore, advantageously and according to the invention, the position of the mobile element is shown by a vector, the dimension of which is the number of degrees of freedom of the mobile element.

A reference system can be selected in which the position (as well as the speed and acceleration) of the mobile element will be shown by a vector, conventionally this is a Cartesian reference system, for example. This can involve a one-dimensional vector (scalar) in the case of a mobile element along a single degree of freedom (for example, a single direction of translation).

Similarly, advantageously and according to the invention, with all of the actuating members having the same number of degrees of freedom, all of the positions of the actuating members are shown by a matrix, the dimensions of which are the number of actuators and the number of degrees of freedom of the actuators.

However, as the actuators are generally actuators with a single degree of freedom (cylinder, rotary motor, etc.), the number of degrees of freedom of the actuating members of an actuator is reduced to one.

For this reason, advantageously and according to the invention, with each actuating member having a single degree of freedom, all of the positions of the actuating members are shown by a vector, the dimension of which is the number of actuators.

Representing and recording the positions of the mobile element and the actuating members in the form of a vector or a matrix particularly allows the implementation of digital processing of the signals.

For this reason, advantageously and according to the invention, the data representing the geometry and the kinematics of the mechanical transmissions is shown and recorded in the form of matrices.

In this way, the development of the vector of the setpoint positions of the actuating members of an actuator is carried out by applying a matrix representing the geometry of the mechanical transmissions to the setpoint position vector of the mobile element.

Similarly, the actuator error signals are shown and recorded in the form of a vector containing the different position error values of each actuating member. This vector, by applying a Jacobian matrix (representing a kinematic model of the machine), is converted into a mobile element error vector that will be processed by the processing module.

Conversely, the effort vector to be applied to the mobile element, obtained after processing of the mobile element error vector by the processing module, is converted into a vector for controlling the actuators by the transpose of the previously used Jacobian matrix.

It is noteworthy that the geometry and kinematics (Jacobian and Jacobian transpose) matrices are not, by definition, squared in a redundant parallel machine, and that their inversion therefore needs to be carried out by pseudo-inversion of matrices rules.

More particularly, a method according to the invention can be applied to at least two large types of machines with redundant parallel actuation, the actuators of which are rotary motors.

In a first type, the motors each actuate a pivoting joint. The mechanical transmissions are then generally parallel jointed arms.

In a second type, the motors each actuate a flexible mechanical transmission such as a cable, with the length of said flexible mechanical transmission to the mobile element being varied by the winding-unwinding of the cable. The coordinated variations of the cable lengths between the various redundant actuators allows a mobile element to be handled within the space, in particular along six degrees of freedom, and to be held in position by the tension of the cables.

The invention is applicable to a device for controlling a machine with redundant parallel actuation designed to implement a control method according to the invention. In particular, the invention is applicable to a device for controlling a machine comprising:
- a frame,
- a mobile element driven in relation to the frame by a plurality of mechanical transmissions, the number of which is strictly greater than the number of degrees of freedom of the mobile element, said mechanical transmissions being parallel to each other and each being actuated by at least one actuator comprising:
  - a body fixed to the frame,
  - at least one member for actuating at least one mechanical transmission, a position sensor designed to produce a signal, referred to as measured position signal, representing a position of the actuating member, said device for controlling the machine comprising:

at least one memory containing data representing the geometry of the mechanical transmissions;

at least one memory containing data representing the kinematics of the mechanical transmissions;

a comparator module designed to be able to produce a signal, referred to as actuator error signal, for each of the actuators by comparing the measured position signal of said actuator with a position setpoint signal of said actuator, wherein it further comprises:

a first converter module designed to be able to produce a mobile element position error signal, referred to as mobile element error signal, by applying data representing the kinematics of the mechanical transmissions;

a module for electronically processing said mobile element error signal designed to be able to produce an effort signal to be applied to the mobile element;

a second converter module designed to be able to produce signals for controlling the actuators by applying data representing the kinematics of the mechanical transmissions to the effort signal.

A control device according to the invention can comprise a plurality of memories or a single memory in which all of the data, and in particular the data representing the geometry and the kinematics of the mechanical transmissions, is stored.

A control device according to the invention further advantageously comprises a third converter module designed to be able to produce position setpoint signals of the actuating members of each actuator by applying data representing the geometry of the mechanical transmissions to a signal representing a setpoint position of the mobile element.

Moreover, advantageously and according to the invention, said control device further comprises:

data representing the inertia of the mobile element stored in a memory, a feed-forward control module designed to process a signal representing a setpoint position of the mobile element and comprising:

two derivation functions relative to the change over time, so as to obtain a signal representing a setpoint acceleration of the mobile element;

a function for multiplying the signal representing an acceleration of the mobile element by the data representing the inertia of the mobile element so as to obtain a force signal to be applied to the mobile element;

an adder module adding the effort signal and the force signal to be applied to the mobile element so as to produce a corrected effort signal.

Advantageously, the invention is simple to implement on existing machines within the context of the improvement of these machines. Indeed, it is sufficient for an existing electronic circuit to be replaced with a device according to the invention or for the device according to the invention to be simply added to the control circuit of the machine or even for the control software of the machine to be simply modified when said machine is fully computer controlled.

The invention further relates to a machine with redundant parallel actuation, the control of which is carried out using a control method according to the invention, and to a machine comprising a control device according to the invention.

The invention further relates to a method and a control device and a machine that is characterized by combining all or part of the features described above or hereafter.

The invention is applicable to a computer program comprising computer program instruction codes for executing the steps of a method according to the invention when said computer program is executed on a computer system, as well as to a computer program product comprising this computer program, in particular to a recording medium that can be read by a computer system, which recording medium stores a computer program comprising computer program code instructions for executing the steps of a method according to the invention when said computer program is executed on a computer system.

BRIEF DESCRIPTION OF THE DRAWINGS

Further objects, features and advantages of the invention will become apparent upon reading the following description, which is provided by way of non-limiting example, and with reference to the appended drawings, wherein.

DETAILED DESCRIPTION OF THE PREFERRED EMBODIMENTS

The method according to the invention (FIGS. 3 and 4) can be implemented by a computer system for processing digital data, in particular by computing software such as Matlab®. In this way, a control device according to the invention can be a computer system (in particular comprising at least one central unit), connected to the actuator 2 position sensors 3 so as to receive the signals and to the actuators (or to power converters connected to the actuators) so as to control said actuators, said computer system being designed to implement a method according to the invention, particularly by software programming.

However, as a variant, there is nothing to prevent these methods from being implemented using physical electronic circuits designed to this end.

Figure 3:
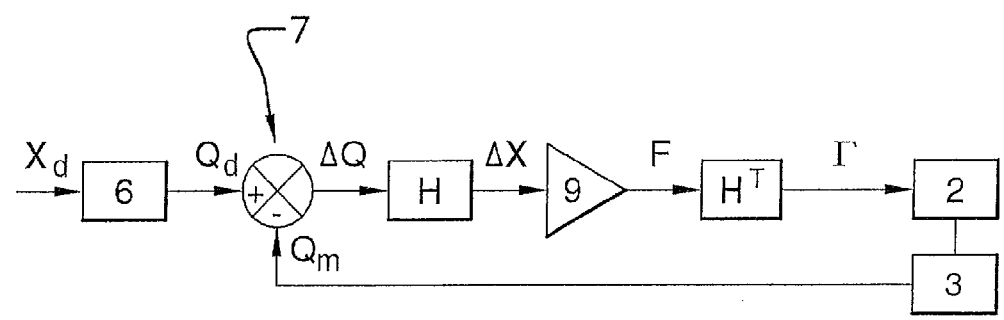
FIG. 3 is a functional block diagram of a method for controlling a machine with redundant parallel actuation according to a first embodiment of the invention.
Figure 4:
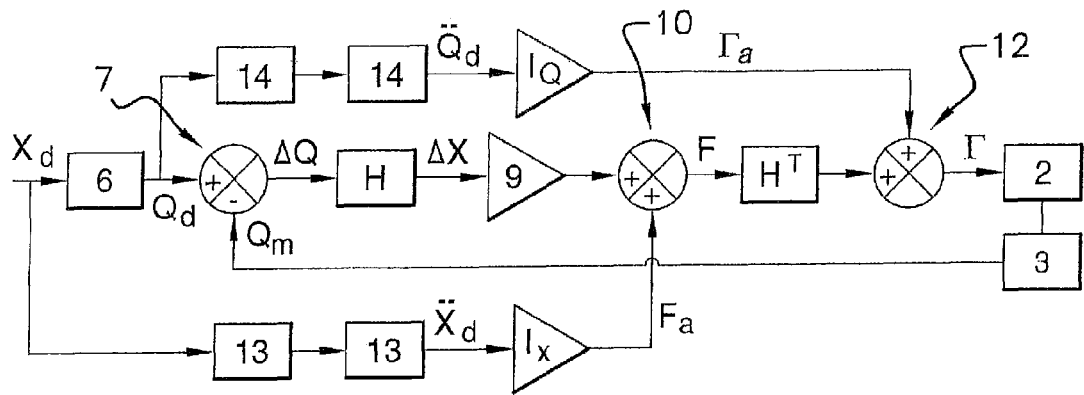
FIG. 4 is a functional block diagram of a method for controlling a machine with redundant parallel actuation according to a second embodiment of the invention.

Therefore, in FIGS. 3 and 4, the values Xd, Qd, Qm, ΔQ, ΔX, F, Γ, Q̈d, Ẍd, Γa, Fa are vectors (or, where necessary, matrices). Ẍd and Q̈d in particular are the acceleration vectors of all of the actuators and of the mobile element, respectively; they are obtained by twice-deriving the position vectors of the mobile element Xd and of the actuators Qd relative to time.

A position setpoint signal Xd of a mobile element 5 is converted, by a geometric matrix converter representing the geometry (and thus the effect of each of the actuators on the position of the mobile element) of the mechanical transmissions 4, into position setpoint signals Qd of the actuators.

Furthermore, sensors 3 measure the position of the actuating members of the actuators 2 and each deliver an electronic signal, referred to as measured position signal, representing the completed measurement. All of these signals are grouped into a vector Qm.

The vectors Qd and Qm are compared (Qm is subtracted from Qd) in order to obtain actuator error signals grouped into a vector ΔQ.

Figure 1:
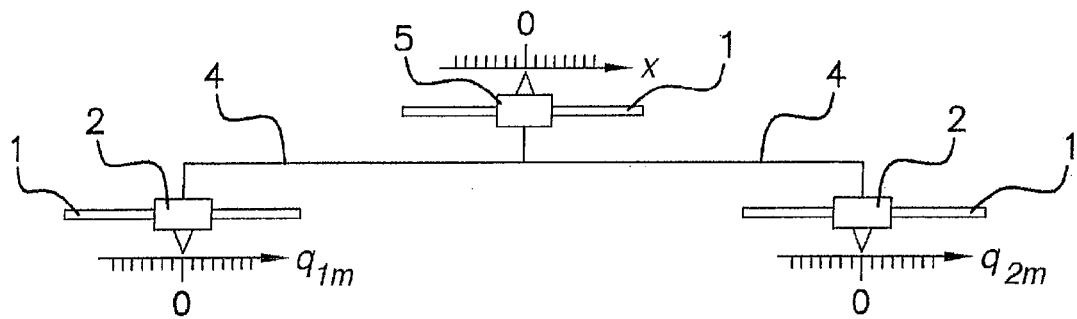
FIG. 1 is a drawing of a first machine with perfect simple redundant parallel actuation.

A machine with perfect redundant parallel actuation, as shown in FIG. 1, comprises two linear actuators 2 mounted in translation along the same direction relative to a frame 1 and allowing the translational movement of a mobile element 5 mounted on a slide rigidly connected to the frame 1 in a direction parallel to the direction of translation of the actuators 2. The mobile element 5 is connected by a rigid mechanical transmission 4, such as a rigid shaft, to each of the two actuators 2. In this way, the mobile element is mobile along a single degree of freedom and is actuated by two parallel actuators, by means of two distinct mechanical transmissions, so that it is a machine with redundant parallel actuation.

Furthermore, sensors 3 (not shown) measure the respective positions q1$m$ and q2$m$ of the actuators. However, the position x of the mobile element is not measured and is thus unknown.

The machine shown in FIG. 1 is perfect. Indeed, when each of the two actuators is in the home position (q1$m$=0 and q2$m$=0, that is Qm=(0, 0)), the mobile element is also at its home position (x=0). Consequently, the machine is balanced (ΔQ=(0, 0)) if the setpoint position Xd is the home position (Xd=0). The actuators are not conflicting.

However, in an actual machine, geometric faults are inevitable. For this reason, in FIG. 2, an actual machine with redundant parallel actuation is shown in which the mechanical transmissions have a length fault: they are respectively shorter by 0.1 and by 0.2 relative to the perfect model of FIG. 1. In this way, with a control method of the prior art, when a setpoint position Xd=0 of the mobile element is provided, each of the two actuators receives a command to return to its home position (q1$m$=0 and q2$m$=0), which is rendered impossible by the geometric faults (Δq1=0 and Δq2=0).

Figure 2:
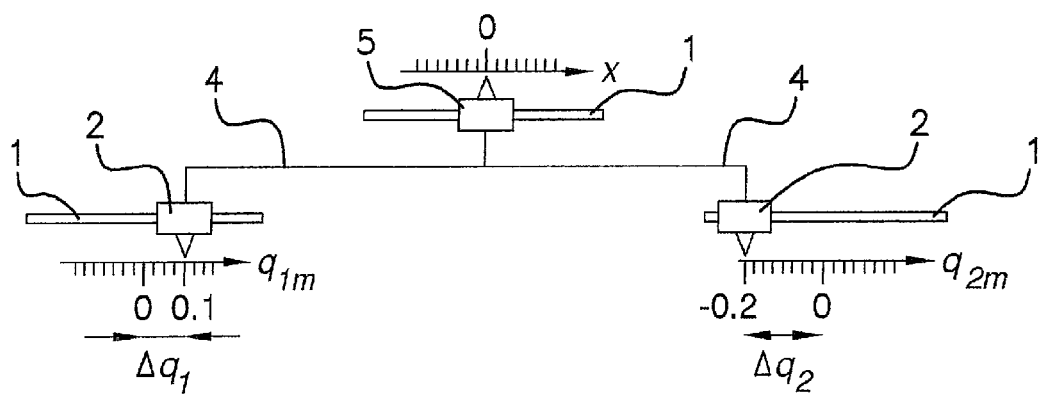
FIG. 2 is a drawing of the first machine with simple redundant parallel actuation showing geometric faults.

Still according to a method of the prior art, and with an imperfect machine as shown in FIG. 2, the actuator error signal ΔQ is ΔQ=(−0.1, 0.2) and it is impossible to achieve a balanced position (ΔQ=(0, 0)). Indeed, the control signals produced by the processing module are contradicting and the actuators will actively oppose each other to return to their setpoint position (q1$m$=0 and q2$m$=0) until there is a potential break in a mechanical transmission 4 or an actuator 2.

This effect is further accentuated when the processing module 9 comprises an integral term: for example, a PID. Indeed, the error ΔQ is incremented over time on each processing loop by the integral term of the PID.

In the method according to the invention, as shown in FIG. 3, the vector representing the actuator error signal ΔQ within the space for representing positions of actuating members is converted into a vector ΔX representing a mobile element error signal within the space for representing positions of the mobile element.

The following relations express the conversion of ΔQ into ΔX, in which H is a pseudo-inverse matrix (minimizing the Euclidean norm) of the Jacobian matrix Jm:

$$\dot{Q}=Jm\dot{X} \tag{1}$$

$$\dot{X}=H\dot{Q} \tag{2}$$

where $\dot{X}$ and $\dot{Q}$ are the speed vectors of the mobile element 5 and of all of the actuators 2, respectively.

The relation (1) depends on the geometry of the mechanical transmissions 4 and on their position and therefore corresponds to a kinematic model of the machine.

The validity of these relations is extended to the case of small increases ΔQ, ΔX and Δt (with Δt being a short time interval of the order of magnitude of the processing time of a control loop according to the invention).

Therefore:

$$\Delta Q = Jm \Delta X \tag{3}$$

$$\Delta X = H \Delta Q \tag{4}$$

ΔX is then processed by a processing module 9 that delivers a vector F representing a force or a moment to be applied to the mobile element.

In a control method according to the invention, ΔX is minimized and not ΔQ. However, if a configuration of the machine does not always exist in which ΔQ=0, at least one configuration always exists such as ΔX=0.

When ΔX=0, the control signal F coming from the processing of the vector ΔX by any processing module is F=0. In this way, the control signals sent to the actuators correspond to commands for the actuators to remain immobile. These actuators therefore do not receive conflicting commands, thus removing any risk of breakage.

The signal F output from the processing module 9 can be considered to represent a force (or a moment) to be applied to the mobile element. This force F is converted into corresponding forces Γ (or moments) used as commands for the actuators. In this way, the vector F is converted by the transpose $H^T$ of the matrix H of the space of the mobile element within the space of the actuators:

$$\Gamma = H^T F \tag{5}$$

So that, when F=0, Γ=0.

The control signals Γ are used to control the actuators 2 and are advantageously converted into power for supplying the actuators.

In this way, in the example of a machine with geometric faults shown in FIG. 2, a setpoint position X=(0) of the mobile element corresponds, via the converter 6 (or geometric matrix), to setpoint positions of the actuators Qd(=0, 0). However, the measurement carried out by the position sensors 3 of the actuators when X=(0) is: Qm=(0.1, −0.2). No position sensor measures the position of the mobile element 5.

Therefore, by virtue of the first comparator 7, which subtracts Qm from Qd, the vector ΔQ=(−0.1, 0.2) is obtained.

However, the machine shown in FIG. 2 is a very simple machine, so that Jm=(1, 1) and thus that H=(0.5, 0.5).

In this way, by virtue of the relation (4), ΔX=(0.05) is obtained.

Therefore, ΔX is not associated with the reality of the position of the mobile element. In effect, in FIG. 2, the setpoint X=(0) is provided, and therefore when the mobile element is in the actual position X=(0), the error ΔX is not zero. This is due to the fact that the position sensors only measure the position of the actuators 2 and that the geometric faults of the mechanical transmissions are not initially known.

However, this error is static over time, at least with regard to the long-term geometric faults (manufacturing tolerances, for example), so that the relative displacements of the mobile element between two successive positions are exact. Furthermore, the considered geometric faults, if they can result in damage to the machine, are negligible in terms of the positioning of the mobile element.

As a function of the processing module 9, a signal is F obtained for this value of $\Delta X=(0.05)$. This signal is converted within the space of the actuators by the relation (5), in which $H^T=(0.5, 0.5)^T$, so that $\Gamma=(0.5F, 0.5F)$.

The control signals, and thus the efforts developed by the actuators, are in the same direction (same sign) and of the same intensity, so that their movement is compatible. The actuators move to the right of FIG. 2 until: Qm=(0.15, −0.15), where $\Delta Q=(-0.15, 0.15)$ and thus according to the relation (4), with H=(0.5, 0.5): $\Delta X=(0)$.

As $\Delta X=(0)$, F=(0) and $\Gamma=(0, 0)$.

In this way, even though a static error remains between the setpoint position (Qd=(0, 0)) of the actuators and their actual measured position (Qm=0.15, −0.15)), and between the setpoint position (Xd=(0)) of the mobile element and its actual position (X=(0.05)), the machine reaches a balanced position in which the actuators do not attempt to jointly return to their setpoint position. The risks of breaking the machine are eliminated.

It is noteworthy that the final position X of the mobile element is not equal to the setpoint position Xd, but is slightly different thereto (X=(0.05)) so as to obtain $\Gamma=0$.

Obtaining $\Delta X=(0)$ and injecting this value into the processing module 9 is particularly advantageous when said module comprises an integral term. In effect, a minimum error that remains at the input of a PID type controller 9, for example, can quickly result in highly conflicting actuator commands. The invention therefore allows a position of the mobile element to be obtained that is very close to a setpoint position (to the nearest geometric faults), but which allows a zero value to be injected into the processing module.

Furthermore, it is also possible, without measuring the position of the mobile element 5, and simply by measuring the positions of the actuators when the machine stops at a position, to obtain information relating to the geometric faults of the machine. Thus, in the example shown above, it is possible to deduce from $(q2m-q1m)=0.15-(-0.15)=0.3$ that the whole of the two mechanical transmission shafts overall is shorter by 0.3 than is expected. There is nothing to prevent this information from being gradually integrated into the method in order to further improve the control of the actuators.

Advantageously, the performance of a method for controlling a machine according to the invention can be improved by adding a feed-forward control loop within the space of the mobile element.

In this way, as shown in FIG. 4, the setpoint position Xd of the mobile element can be twice-derived by two differentiators 13 in series so as to obtain a setpoint acceleration $\ddot{X}d$ of the mobile element. This setpoint acceleration is then multiplied by an inertia matrix Ix representing the inertia of the mobile element along each degree of freedom of the mobile element so as to obtain a homogenous term with a force Fa that is added by an adder-comparator 10 to the effort vector to be applied to the mobile element obtained at the output of the processing module 9 and before conversion within the space of the actuators by the matrix $H^T$.

Such a feed-forward control loop within the space of the mobile element further improves the performance of the machine, in particular its speed for reaching a position and thus its speed of execution.

Furthermore, as a variant or in combination, a feed-forward control loop within the space of the actuators can also be provided. The setpoint positions Qd of the actuators obtained on the basis of the setpoint positions Xd of the mobile element are twice-derived by two differentiators 14 in series so as to obtain setpoint accelerations $\ddot{Q}d$ of the actuators. These setpoint accelerations are then multiplied by an inertia matrix Iq representing the inertia of each of the actuators so as to obtain a term homogenous with a force $\Gamma a$ that is added by an adder-comparator 12 to the signal obtained at the output of the matrix $H^T$ and to form the control signal sent to the actuators 2.

This loop also improves the performance of a method for controlling a machine according to the invention.

The method according to the invention can be implemented by computer programming, for example using a real-time development environment.

Figure 5:
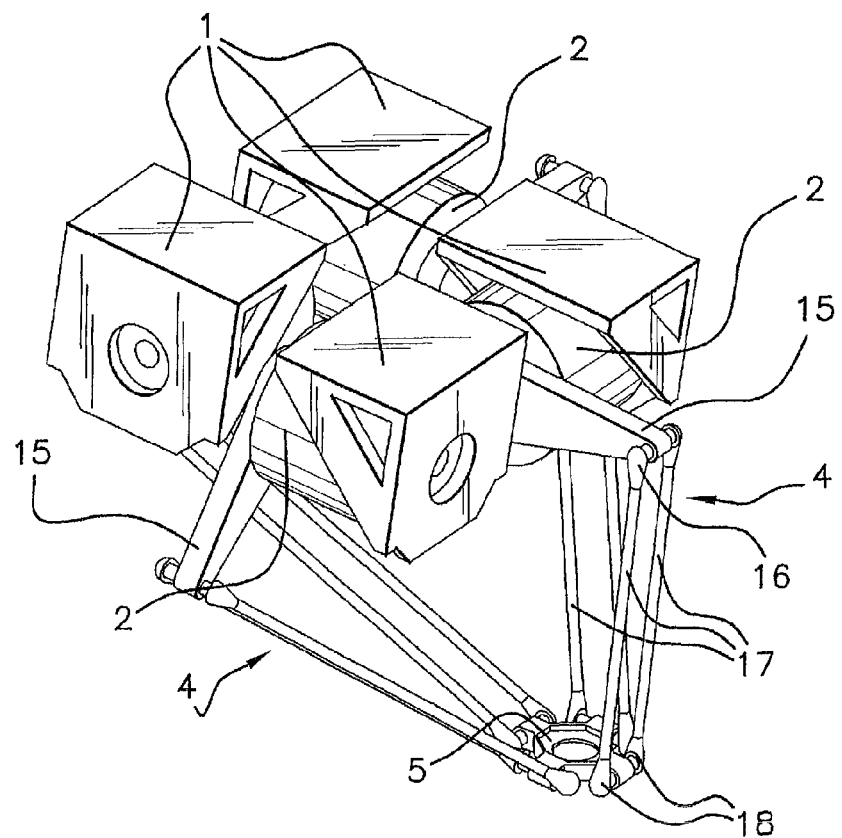
FIG. 5 is a three-dimensional drawing of a second machine with redundant parallel actuation.

A method according to the invention allows a machine to be controlled, for example, as shown in FIG. 5.

In this machine, four actuators 2 are rotary motors oriented so that their rotor axis is orthogonal to those of its two neighbors. The stators of the four actuators 2 are fixed to a frame 1.

The machine comprises a fixture 5 that can move within the space along three degrees of freedom: height, depth and width; it is therefore possible, for example, to select a Cartesian reference system to show its position within the space.

The fixture 5 is connected by four mechanical transmission arms 4 to the four actuators 2. The four actuators therefore act in parallel upon the displacement of the fixture 5 along three degrees of freedom via the four mechanical transmissions so that this is an example of a machine with redundant parallel actuation.

The actuators form driven pivoting joints of the transmission arms 4 so that the term "articulating space" is sometimes used to designate the space of the actuators in which all of the positions of the actuators are shown.

The transmission arms 4 advantageously are each formed by an arm 15 rigidly fixed to the rotor of an actuator 2 by one of its ends and connected by a spherical link 16 at its second end to a forearm 17. Each forearm 17 extends from a spherical link 16 with an arm 15 to a spherical link 18 with the fixture 5. In this way, each assembly formed by an arm 15 and a forearm 17 forms a transmission of the crank-connecting rod type.

Advantageously, the forearms 17 are formed by two parallel shafts that are flexibly connected together. These shafts advantageously have concave ends that are flexibly held in position on ball joints of the arms 15 and of the fixture 5, respectively.

In such a machine, in order to simplify the modelling of the inertia matrices Ix and Iq, the inertia of the arms 15 and of half of the forearms 17 is added to the inertia of the rotor of the corresponding actuator, and the other half of the inertia of the forearms 17 is added to the inertia of the mobile fixture 5.

Such a machine is generally used with a tool mounted on the fixture 5, for example a gripper tool for undertaking operations for sampling, developing and positioning objects.

The invention can be subject to numerous other variants of embodiments that are not shown.

In particular, the invention is applicable to all types of machines with redundant parallel actuation. For example, it is also applicable to machines in which a mobile element is connected to actuators by cables in tension, with each actuator being designed to modify the length of the cable separating it from the mobile element. Such a machine can, for example, have eight cables each actuated by an actuator and allow a mobile element to be moved along six degrees of freedom within the space.

A method according to the invention in particular can also be applied to machines with a number of actuators different to that of the example shown, as long as this number of actuators is greater than the number of degrees of freedom of the mobile element.

Furthermore, there is nothing to prevent the method according to the invention from being implemented using a physical device of the electronic circuit type.

Numerous functions advantageously can be added to a control method according to the invention. In effect, other feed-forward or feedback loops can be contemplated, processing modules can be inserted, etc.

Furthermore, there is nothing to prevent one (or more) mechanical transmission(s) itself/themselves having additional actuators so as to form a redundant in-series actuation-transmission chain.

The invention claimed is:

1. A method for controlling a machine including a frame, and a mobile element driven in relation to said frame along a number of degrees of freedom by a plurality of mechanical transmissions, the number of mechanical transmissions being strictly greater than the number of degrees of freedom of said mobile element, said mechanical transmissions being in parallel to each other and each being actuated by at least one actuator including a body fixed to said frame, an actuating member configured to actuate one of the mechanical transmissions, and a position sensor configured to produce a measured position signal representing a position of said actuating member, the method comprising:

for each of said actuators, producing an actuator error signal by comparing said measured position signal of said actuator with a position setpoint signal of said actuator;

converting each of said actuator error signals into a mobile element position error signal by applying data representing the kinematics of said mechanical transmissions;

processing each said mobile element error signal by a processing device configured to produce an effort signal to be applied to said mobile element; and converting each said effort signal into signals for controlling said actuators by applying data representing the kinematics of said mechanical transmissions.

2. The method of claim 1, further comprising obtaining the position setpoint signal of said actuating member of each actuator by applying data representing the geometry of said mechanical transmissions to a signal representing a setpoint position of said mobile element.

3. The method of claim 1, wherein said processing device comprises a controller of a proportional integral derivative (PID) type.

4. The method of claim 1, further comprising adding a signal representing a setpoint acceleration of said mobile element multiplied by an inertia coefficient representing the inertia of said mobile element to said effort signal.

5. The method of claim 1, further comprising adding a signal representing a setpoint acceleration of each actuator to the signal that controls said actuator.

6. The method of claim 1, wherein the position of said mobile element is represented by a vector, the dimension of the vector being the number of degrees of freedom of said mobile element.

7. The method of claim 1, wherein, with all of said actuating members having the same number of degrees of freedom, all of the positions of said actuating members are represented by a matrix, the dimensions of the matrix being the number of actuators and the number of degrees of freedom of said actuators.

8. The method of claim 6, wherein the data representing the geometry and the kinematics of said mechanical transmissions is represented in the form of matrices.

9. A device for controlling a machine comprising:

a frame;

a mobile element driven in relation to said frame by a plurality of mechanical transmissions, the number of mechanical transmissions being strictly greater than the number of degrees of freedom of said mobile element, said mechanical transmissions being in parallel to each other and each being actuated by at least one actuator including a body fixed to said frame, at least one actuating member configured to actuate at least one of the mechanical transmissions, and a position sensor configured to produce a measured position signal representing a position of said actuating member;

at least one memory containing data representing the geometry of said mechanical transmissions and containing data representing the kinematics of said mechanical transmissions;

a comparator module configured to produce an actuator error signal for each of said actuators by comparing the measured position signal of said actuator with a position setpoint signal of said actuator;

a first converter module configured to produce a mobile element position error signal by applying data representing the kinematics of said mechanical transmissions;

a module configured to electronically process said mobile element error signal designed to be able to produce an effort signal to be applied to said mobile element; and a second converter module configured to produce signals for controlling said actuators by applying data representing the kinematics of said mechanical transmissions to said effort signal.

10. A non-transitory recording medium that can be read by a computer system, the recording medium storing a computer program comprising computer program instruction codes for executing a method for controlling a machine including a frame, and a mobile element driven in relation to said frame along a number of degrees of freedom by a plurality of mechanical transmissions, the number of mechanical transmissions being strictly greater than the number of degrees of freedom of said mobile element, said mechanical transmissions being in parallel to each other and each being actuated by at least one actuator including a body fixed to said frame, an actuating member configured to actuate one of the mechanical transmissions, and a position sensor configured to produce a measured position signal representing a position of said actuating member, the method comprising:

for each of said actuators, producing an actuator error signal by comparing said measured position signal of said actuator with a position setpoint signal of said actuator;

converting each of said actuator error signals into a mobile element position error signal by applying data representing the kinematics of said mechanical transmissions;

processing each said mobile element error signal by a processing module configured to produce an effort signal to be applied to said mobile element; and converting each said effort signal into signals for controlling said actuators by applying data representing the kinematics of said mechanical transmissions.

* * * * *